May 15, 1928.  1,669,534

G. RABITZ

INTERNAL RELIEF VALVE

Filed June 11, 1927

INVENTOR.

George Rabitz

BY Morsell, Keeney + Morsell.
ATTORNEYS.

Patented May 15, 1928.

1,669,534

UNITED STATES PATENT OFFICE.

GEORGE RABITZ, OF MILWAUKEE, WISCONSIN.

INTERNAL RELIEF VALVE.

Application filed June 11, 1927. Serial No. 198,068.

This invention relates to improvements in internal relief valves.

It is the primary object of the present invention to provide an internal relief valve for use in vehicle radiators, heating radiators, pipes, and other comparatively small chambers to relieve the pressure caused by freezing water therein to prevent breakage.

A further object of the invention is to provide a relief valve of the character described in which the valve is operated against the tension of a spring and so arranged that the tension of the spring will be checked upon a predetermined movement of the valve in order that the chamber contents may be quickly released without being unduly retarded and restricted.

A further object of the invention is to provide a relief valve of the character described in which the spring is in the external end portion of the valve and arranged so that it will not become inoperative should ice form in the valve.

A further object of the invention is to provide a relief valve with which any type of chamber of the class mentioned may be readily equipped.

A further object of the invention is to provide an internal relief valve which is of very simple construction, is efficient and automatic in operation, is strong and durable, is inexpensive to manufacture, and is well adapted for the purpose described.

With the above and other objects in view the invention consists of the improved internal relief valve and its parts and combinations as set forth in the claims, and all equivalents thereof.

In the accompanying drawing in which the same reference characters indicate the same parts in all of the views.

Figure 1:
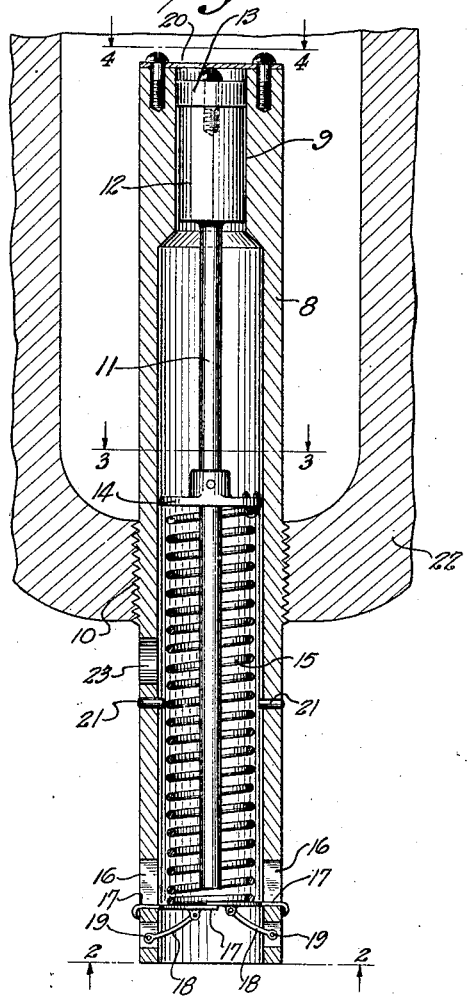
Fig. 1 is a fragmentary sectional view of a chamber showing the installation of the relief valve, the latter being shown in longitudinal section.
Figure 2:
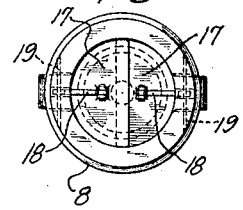
Fig. 2 is a view of the outer end of the relief valve taken on line 2—2 of Fig. 1.
Figure 3:
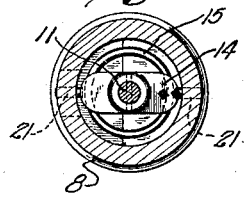
Fig. 3 is a cross-sectional view taken on line 3—3 of Fig. 1.
Figure 4:
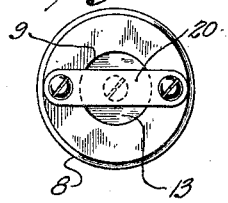
Fig. 4 is a view of the inner end of the relief valve taken on line 4—4 of Fig. 1.

Referring now more particularly to the drawing it will appear that the numeral 8 indicates a tubular member having an open inner end portion and an open outer end portion, the bore of the inner end portion being of a reduced diameter for a substantial distance, as at 9. The medial portion of the tubular member is externally threaded, as at 10.

Extending longitudinally within the tubular member is an elongated stem 11 having formed at its inner end portion a piston 12 of slightly less diameter than the diameter of the reduced bore portion 9 and adapted to move therein. A soft rubber or composition disc member or valve 13 is secured to the outer end portion of the piston 12, said valve being of a larger diameter than the piston and of such a nature that it will non-leakably seal the bore 9. The stem 11, intermediate its ends, carries a plate 14 to the outer face of which is secured one end of a coiled spring 15.

The outer end portion of the tubular member 8 is formed with a pair of opposed openings 16 through which extend a pair of semi-circular gates 17, said gates normally closing the tubular member and slightly overlapping at their adjacent edge portions. Each gate is pivotally connected, inwardly of its mid-portion, to an arm or lever 18, the other end portion of the lever being in turn pivotally mounted on a pin 19 extended through the wall of the tubular member. When in closed position the outer end portion of each gate extends slightly outwardly through its opening 16 and is formed with an inturned portion to engage the exterior of the casing wall.

A flat bar 20 is secured across the inner end portion of the tubular member 8 and is adapted to engage the valve 13 to limit its movement in one direction. Also, the tubular member, intermediate its ends, is formed with a pair of inwardly projecting studs 21 which are adapted to engage the plate 14 when the stem 11 is moved outwardly, thereby limiting the outward movement of the stem.

In use, the tubular member is threaded into a chamber 22 such as a vehicle or heating radiator, a pipe or the like, with the inner end portion of the member extending into the chamber a substantial distance and the outer end portion of the member exteriorly of the chamber. The spring 15 is of such a strength and tension that it will withstand a predetermined or normal pressure, but if freezing occurs within the chamber the pressure will be increased against the end portion of the valve, and the stem and piston and valve carried thereby will be moved out of the reduced bore portion 9, opening the same and allowing water to flow from the chamber into the tubular member. During this movement of the stem and valve, the gates 17, which are normally closed as shown in Fig. 1, are struck at their inner end portions by the end of the stem and are folded or pushed to open position. In moving to open position, said gates pivot with respect to the levers 18, the outer ends of the gates moving inwardly through the openings 16, and the levers also pivot on the pins 19, with the result that the gates open widely against the inner walls of the tubular member and the outer end of the tubular member is unrestricted and the water may flow rapidly therefrom. There is also provided in the tubular member a side opening 23 through which water may escape. This escape of water from the chamber will relieve the pressure occasioned by freezing and prevent breakage. To reset the valve the piston and stem and coiled spring are pushed inwardly and the gates 18 are closed. The gates are normally releasably held in closed position by the spring 15 which exerts a pressure on the same outwardly of their pivotal connections with the levers, and by the bent outer end portions which engage the outer surface of the tubular member.

From the foregoing description it will be seen that the improved internal relief valve for chambers is of very simple and novel construction, and is well adapted for the purpose described.

What I claim as my invention is:

1. A relief valve, comprising a tubular member having an inlet opening and an outlet opening, a stem longitudinally movable within said tubular member, a valve carried by said stem interiorly of said tubular member and controlling said inlet opening, a gate at the outlet end portion of the tubular member, and a spring connected to the stem and engaging the gate and exerting an expansive force to normally hold the stem in valve closing position and the gate in closed position.

2. A relief valve, comprising a tubular member having an inlet opening and an outlet opening, a stem longitudinally movable within the tubular member and carrying a lug intermediate its ends, a valve carried by the stem interiorly of said tubular member and controlling said inlet opening, a gate at the outlet end portion of the tubular member, and a spring confined between said stem lug and the gate and exerting an expansive force to normally hold the stem in valve closing position and the gate in closed position.

3. A relief valve, comprising a tubular member having an inlet opening and an outlet opening, a stem longitudinally movable within the tubular member and carrying a lug intermediate its ends, a valve carried by the stem interiorly of the tubular member and controlling said inlet opening, a pair of gates movably mounted within the outlet end portion of the tubular member, and a spring confined between said stem lug and the gates and exerting an expansive force to normally hold the stem in valve closing position and the gates in closed position.

4. A relief valve, comprising a tubular member having an inlet opening and an outlet opening, a gate movably mounted within the outlet end portion of the tubular member, a valve within the inlet end portion of the tubular member and movable therein to control said inlet opening, a stem movable within the tubular member and attached to said valve, the stem in the closed position of the valve terminating adjacent said gate, and a spring attached to said stem and engaging the gate to normally hold it in closed position, and exerting a force on the stem to yieldingly hold it in valve closing position, the gate being opened by said stem upon an outward movement of the same.

5. The combination with a fluid filled chamber, of a tubular member threaded thereinto and extending a substantial distance into the chamber, a portion of the tubular member being exteriorly of the chamber, a stem longitudinally movable within the tubular member and carrying a lug intermediate its ends, a valve carried by the stem interiorly of the tubular member and controlling entrance to the inner end portion thereof, a pair of gates foldably mounted within the outer end portion of the tubular member, and a spring confined between said stem lug and the gates and exerting an expansive force to normally hold the stem in valve closing position and the gates in closed position, the gates being opened by contact with the stem when the same is moved to valve opening position.

In testimony whereof, I affix my signature.

GEORGE RABITZ.